United States Patent
Manabe et al.

(10) Patent No.: US 10,714,754 B2
(45) Date of Patent: Jul. 14, 2020

(54) SURFACE-TREATED GRAPHENE, SURFACE-TREATED GRAPHENE/ORGANIC SOLVENT DISPERSION LIQUID, SURFACE-TREATED GRAPHENE/ELECTRODE ACTIVE MATERIAL COMPOSITE PARTICLES AND ELECTRODE PASTE

(71) Applicant: Toray Industries, Inc., Tokyo (JP)

(72) Inventors: Koichiro Manabe, Otsu (JP); Eiichiro Tamaki, Otsu (JP); Manabu Kawasaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 5 days.

(21) Appl. No.: 16/077,627

(22) PCT Filed: Feb. 20, 2017

(86) PCT No.: PCT/JP2017/006088
§ 371 (c)(1),
(2) Date: Aug. 13, 2018

(87) PCT Pub. No.: WO2017/154533
PCT Pub. Date: Sep. 14, 2017

(65) Prior Publication Data
US 2019/0051903 A1 Feb. 14, 2019

(30) Foreign Application Priority Data
Mar. 9, 2016 (JP) .................................. 2016-045390

(51) Int. Cl.
| | | |
|---|---|---|
| H01M 4/62 | (2006.01) | |
| C01B 32/15 | (2017.01) | |
| C01B 32/182 | (2017.01) | |
| C08L 101/00 | (2006.01) | |
| H01M 4/36 | (2006.01) | |
| C01B 32/18 | (2017.01) | |
| H01M 4/131 | (2010.01) | |
| H01M 4/139 | (2010.01) | |
| C08K 9/04 | (2006.01) | |
| C01B 32/194 | (2017.01) | |
| B82Y 30/00 | (2011.01) | |
| B82Y 40/00 | (2011.01) | |

(52) U.S. Cl.
CPC ............ H01M 4/625 (2013.01); C01B 32/15 (2017.08); C01B 32/18 (2017.08); C01B 32/182 (2017.08); C01B 32/194 (2017.08); C08K 9/04 (2013.01); C08L 101/00 (2013.01); H01M 4/131 (2013.01); H01M 4/139 (2013.01); H01M 4/36 (2013.01); H01M 4/62 (2013.01); B82Y 30/00 (2013.01); B82Y 40/00 (2013.01); C01B 2204/22 (2013.01); C01B 2204/28 (2013.01); C01B 2204/32 (2013.01)

(58) Field of Classification Search
CPC .................................. H01M 4/625; C08K 3/04
USPC ..................................................... 429/231.95
See application file for complete search history.

(56) References Cited

U.S. PATENT DOCUMENTS
| | | |
|---|---|---|
| 7,390,474 B2 | 6/2008 | Suzuki et al. |
| 9,458,325 B2 | 10/2016 | Zhang et al. |
| (Continued) | | |

FOREIGN PATENT DOCUMENTS
| | | | | |
|---|---|---|---|---|
| CN | 103834127 A | * | 6/2014 | ............... C08K 3/04 |
| CN | 102398900 B | | 9/2015 | |
| (Continued) | | | | |

OTHER PUBLICATIONS

International Search Report and Written Opinion for International Application No. PCT/JP2017/000608, dated Apr. 11, 2017—9 pages.
Japanese Notification of Reasons for Refusal for Japanese Application No. 2017-516000, dated Aug. 29, 2017, with translation, 6 pages.

(Continued)

*Primary Examiner* — Khanh T Nguyen
(74) *Attorney, Agent, or Firm* — RatnerPrestia

(57) ABSTRACT

The purpose of the present invention is to provide a graphene which has high dispersibility, high electrical conductivity and oxidation resistance namely a graphene which has high electrochemical stability. In order to achieve the above-described purpose, a surface-treated graphene according to the present invention is obtained by having a compound represented by general formula (1) or a neutralized salt thereof adhere to a graphene. In general formula (1), A represents a benzene-based aromatic group with a condensation number of 1-4, which has no phenolic hydroxy group; $R^1$ represents a direct bond, a divalent hydrocarbon group having 1-12 carbon atoms, or a divalent organic group having 1-12 carbon atoms, which has a structure selected from the group consisting of an ether bond, an ester bond, an alcohol structure and a carbonyl structure; each of $R^2$ and $R^3$ independently represents a hydrogen atom, a hydrocarbon group having 1-12 carbon atoms, or an organic group having 1-12 carbon atoms, which has a structure selected from the group consisting of an ether bond, an ester bond, an alcohol structure and a carbonyl structure; and n represents an integer of 1-6.

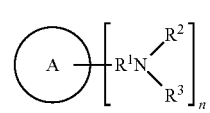

(1)

13 Claims, No Drawings

(56) References Cited

U.S. PATENT DOCUMENTS

| | | | |
|---|---|---|---|
| 9,642,254 B2 | 5/2017 | Prud'Homme et al. | |
| 2014/0054550 A1 | 2/2014 | Hong et al. | |
| 2015/0140438 A1* | 5/2015 | Sun | H01M 4/625 429/231.95 |
| 2016/0326393 A1 | 11/2016 | Jung et al. | |

FOREIGN PATENT DOCUMENTS

| | | |
|---|---|---|
| JP | 2000014163 A | 1/2000 |
| JP | 2000037081 A | 2/2000 |
| JP | 2000333473 A | 11/2000 |
| JP | 2001258264 A | 9/2001 |
| JP | 2002105850 A | 4/2002 |
| JP | 2009511415 A | 3/2006 |
| JP | 2011195351 A | 10/2011 |
| JP | 2013162699 A | 8/2013 |
| JP | 2014518827 A | 8/2014 |
| JP | 2015017158 A | 4/2015 |
| JP | 2015520109 A | 7/2015 |
| JP | 2016030713 A | 3/2016 |
| KR | 20130134446 A | 12/2013 |
| WO | 2004028966 A1 | 4/2004 |
| WO | 2015099462 A1 | 7/2015 |

OTHER PUBLICATIONS

Liu, S., et al., "A method for the production of reduced graphene oxide using benzylemine as a reducing and stabilizing agent and its subsequent decoration with Ag nanoparticies for enzymeless hydrogen peroxide detection," Mar. 29, 2011, pp. 3158-3164, vol. 49. Carbon.

Korean Notification of Reason for Refusal for Korean Application No. 10-2018-7026236, dated Aug. 8, 2019, with translation, 11 pages.

Korean Notification of Reason for Refusal for Korean Application No. 10-2018-7026236, dated Oct. 27. 2019, with translation, 9 pages.

Komlev, A.A. et al., "Magnetism of aniline modified graphene-based materials," Nov. 23, 2015, pp. 45-50, vol. 415, XP029571746, ISSN: 0304-8853, Journal of Magnetism and Magnetic Materials, Elsevier, Amsterdam, NL.

Extended European Search Report for European Application No. 17 762 876.5, dated Oct. 11, 2019, 11 pages.

International Search Report and Written Opinion for International Application No. PCT/JP2017/006088, dated Mar. 14, 2017, 6 pages.

Xu et al., "Dopamine-Induced Reduction and Functionalization of Graphene Oxide Nanosheets", Macromolecules, 2010, vol. 43, No. 20, pp. 8336-8339.

* cited by examiner

SURFACE-TREATED GRAPHENE, SURFACE-TREATED GRAPHENE/ORGANIC SOLVENT DISPERSION LIQUID, SURFACE-TREATED GRAPHENE/ELECTRODE ACTIVE MATERIAL COMPOSITE PARTICLES AND ELECTRODE PASTE

CROSS REFERENCE TO RELATED APPLICATIONS

This is the U.S. National Phase application of PCT/JP2017/006088, filed Feb. 20, 2017, which claims priority to Japanese Patent Application No. 2016-045390, filed Mar. 9, 2016, the disclosures of each of these applications being incorporated herein by reference in their entireties for all purposes.

TECHNICAL FIELD OF THE INVENTION

The present invention relates to a surface-treated graphene, a surface-treated graphene/organic solvent dispersion liquid, and surface-treated graphene/active material composite particles and an electrode paste containing the surface-treated graphene. The present invention also relates to a method for producing a surface-treated graphene and a method for producing a surface-treated graphene/organic solvent dispersion liquid.

BACKGROUND OF THE INVENTION

A graphene is a two-dimensional crystal composed of carbon atoms, and is a material that has been drawing much attention since it was discovered in 2004. A graphene has excellent electric, heat, optical, and mechanical characteristics, and is expected to be widely applied in the fields of battery materials, energy storage materials, electronic devices, composite materials, and the like.

Examples of the method for producing a graphene include a mechanical peeling method, a chemical vapor deposition (CVD) method, a crystal epitaxial growth (CEG) method, and a redox method. Among them, the redox method, that is, a method of oxidizing natural graphite to produce graphite oxide or oxidized graphite and then reducing the product to produce a graphene is promising as an industrial production method because the method is capable of mass production.

In Patent Document 1, flaky graphite having a large specific surface area is produced by thermally reducing oxidized graphite while expanding and peeling the oxidized graphite at the same time. However, the graphene produced by the thermal expansion and reduction method as disclosed in Patent Document 1 has too large a specific surface area and induces aggregation, and is poor in dispersibility.

Therefore, in Patent Document 2, a compound having a catechol group is used as a surface treatment agent for improving dispersibility.

PRIOR ART DOCUMENTS

Patent Documents

Patent Document 1: Published Japanese Translation No. 2009-511415
Patent Document 2: Published Japanese Translation No. 2015-520109

SUMMARY OF THE INVENTION

The graphene powder described in Patent Document 2, however, tends to have low oxidation resistance because the catechol group is electrochemically unstable. An object of the present invention is to provide a graphene that has high dispersibility, high electric conductivity, and high oxidation resistance, that is, has high electrochemical stability, and thus can be suitably used as a conductive aid for electrodes.

The surface-treated graphene of the present invention for solving the above-mentioned problems is a surface-treated graphene containing a graphene and a compound represented by the following general formula (1) or a neutralized salt thereof attached to the graphene:

[Chemical Formula 1]

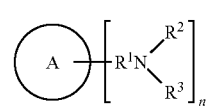

(1)

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

The surface-treated graphene of the present invention can effectively suppress aggregation of the graphene while maintaining high electric conductivity and high electrochemical stability.

DETAILED DESCRIPTION OF CERTAIN EMBODIMENTS OF THE INVENTION

<Surface-Treated Graphene>

The surface-treated graphene of the present invention contains a graphene and a compound represented by the following general formula (1) or a neutralized salt thereof attached to the graphene:

[Chemical Formula 2]

(1)

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

The surface-treated graphene of the present invention is a product in which a compound having a specific chemical structure, as a surface treatment agent, is attached to the surface of a graphene. That is, in the present description, such a graphene having a surface treatment agent attached thereto is referred to as the "surface-treated graphene of the present invention" or simply as the "surface-treated graphene".

A graphene is a structure including a laminate of single layers of graphene, and has a flaky form. The thickness of the surface-treated graphene of the present invention is not particularly limited, but is preferably 100 nm or less, more preferably 50 nm or less, still more preferably 20 nm or less. The size of the surface-treated graphene in the plane direction (average of the longest diameter and the shortest diameter) is also not particularly limited, but the lower limit is preferably 0.5 μm or more, more preferably 0.7 μm or more, still more preferably 1.0 μm or more, and the upper limit is preferably 50 μm or less, more preferably 10 μm or less, still more preferably 5 μm or less. The thickness and the size in the plane direction of the surface-treated graphene can be measured by diluting the surface-treated graphene to 0.002 to 0.005% by mass in a N-methylpyrrolidone (NMP) solvent, dropping the resulting liquid on a smooth substrate such as a glass substrate, drying the liquid, and observing the liquid with a laser microscope or an atomic force microscope. More specifically, the thickness and the size in the plane direction can be measured by the methods described in Measurement Examples 5 and 6 described later, respectively.

The surface-treated graphene of the present invention contains a graphene and a surface treatment agent attached to a surface of the graphene. The surface treatment agent exerts an effect of improving the dispersibility of the graphene due to being present in a state of being attached to a surface of the graphene. In the present invention, a compound represented by the following general formula (1) or a neutralized salt thereof is used as the surface treatment agent. Hereinafter, the compound or a neutralized salt thereof will be referred to for convenience as the "surface treatment agent used in the present invention":

[Chemical Formula 3]

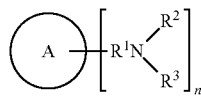
(1)

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

In the general formula (1), the benzene-based aromatic group represented by A is an organic group having an aromatic ring containing no heteroatom or a structure in which such aromatic rings are condensed with each other. The benzene-based aromatic group may be monocyclic or polycyclic, and the condensation number is preferably 1 or more and 4 or less from the viewpoint of improving the effect of dispersing the graphene. In addition, the benzene-based aromatic group may have a substituent, but does not have a phenolic hydroxy group. A phenolic hydroxy group refers to a hydroxy group directly bonded to an aromatic ring. Since the benzene-based aromatic group does not have a phenolic hydroxy group that is susceptible to electrochemical oxidation as a substituent of the aromatic ring, it is possible to suppress the reduction in the electrochemical stability of the surface-treated graphene caused by the surface treatment agent.

From the viewpoint of strengthening the effect of donating electrons from an amino group to the benzene-based aromatic group, in the general formula (1), $R^1$ is preferably an alkylene group having 1 to 12 carbon atoms, an alkenoxyalkylene group having 2 to 12 carbon atoms, or a direct bond. The compound is more preferably a compound in which $R^1$ is an alkylene group having 1 to 6 carbon atoms, an alkenoxyalkylene group having 2 to 6 carbon atoms, or a direct bond, and is still more preferably a compound in which $R^1$ is an alkylene group having 1 to 4 carbon atoms, an alkenoxyalkylene group having 2 to 4 carbon atoms, or a direct bond. In particular, a compound having a lower molecular weight, in which $R^1$ is an alkylene group having 1 to 2 carbon atoms, an alkenoxyalkylene group having 2 carbon atoms, or a direct bond is preferable because the compound can suppress the decrease in the electric conductivity of the surface-treated graphene caused by the surface treatment agent. In the present invention, an "alkenoxyalkylene group" refers to a divalent group in which one of carbon atoms of an alkylene group is substituted with an oxygen atom. That is, the alkenoxyalkylene group represents a divalent group represented by the following general formula:

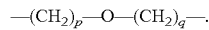
$-(CH_2)_p-O-(CH_2)_q-$.

In the general formula, p and q each represent an integer of 1 or more.

In the general formula (1), when $R^1$ is a divalent hydrocarbon group having 1 to 12 carbon atoms, the hydrocarbon group may have a phenylene structure.

In order to suppress the steric hindrance effect of an amino group interacting with the graphene, in the surface-treated graphene of the present invention, $R^2$ and $R^3$ in the general formula (1) are preferably each a hydrogen atom, a phenyl group, an alkyl group having 1 to 12 carbon atoms, or an alkoxyalkyl group having 2 to 12 carbon atoms. The compound is more preferably a compound in which $R^2$ and $R^3$ are each a hydrogen atom, a phenyl group, an alkyl group having 1 to 6 carbon atoms, or an alkoxyalkyl group having 2 to 6 carbon atoms, and is still more preferably a compound in which $R^2$ and $R^3$ are each a hydrogen atom, an alkyl group having 1 to 4 carbon atoms, or an alkoxyalkyl group having 2 to 4 carbon atoms. In particular, a compound having a lower molecular weight, in which $R^2$ and $R^3$ are each a hydrogen atom is preferable because the compound can suppress the decrease in the electric conductivity of the surface-treated graphene caused by the surface treatment agent. In the general formula (1), when $R^2$ and $R^3$ are each a divalent hydrocarbon group having 1 to 12 carbon atoms, the hydrocarbon group may have a phenylene structure.

Specific examples of the surface treatment agent used in the present invention include 2-chloroaniline, 3-chloroaniline, 4-chloroaniline, benzylamine, phenylethylamine, 1-naphthylamine, 2-naphthylamine, 1,4-diaminoanthraquinone, 1,5-diaminonaphthalene, 1,8-diaminonaphthalene, 2,3-diaminonaphthalene, aniline, 4-chloroaniline, p-toluidine, m-toluidine, o-toluidine, N-methyl-p-toluidine, 1-aminoanthracene, 2-aminoanthracene, 9-aminoanthracene, 1-aminopyrene, 1,6-diaminopyrene, 1,8-diaminopyrene, 3-(2-naphthyl)-L-alanine, 2-(1-naphthyl)acetamide, N-methyl-1-naphthylmethylamine, 1,4-phenylenediamine, 1,3-phenylenediamine, 1,2-phenylenediamine, N,N-dimethyl-1,4-phenylenediamine, N-methylaniline, N-ethylaniline, N-isopropylaniline, 4-ethylaniline, 4-isopropylaniline, N,N-dimethylaniline, 4-nitroaniline, 1,2,4-triaminobenzene, N,N,N',N'-tetramethyl-1,4-phenylenediamine, diphenylamine, N-methyldiphenylamine, 4-aminodiphenylamine, 4-aminotriphenylamine, 2-bromoaniline, 2,4-dibromoaniline, 2,3-dichloroaniline, 2,4-dichloroaniline, 2,5-dichloroaniline, 3,4-dichloroaniline, 3,5-dichloroaniline, N,N'-diphenyl-1,4-phenylenediamine, 4-fluoroaniline, 3-fluoroaniline, 2-fluoroaniline, 2,6-difluoroaniline, 2-iodoaniline, 4-iodoaniline, 3-iodoaniline, N-methyl-1-naphthylamine, N,N-dimethyl-1-naphthylamine, N,N-dimethyl-2-naphthylamine, 2,4,6-trichloroaniline, 2-chloro-1,4-phenylenediamine, 2,4-dimethylaniline, 2,6-dimethylaniline, 3,4-dimethylaniline, 3,5-dimethylaniline, 4-cyanoaniline, 2,6-diaminotoluene, N-phenyl-1-naphthylamine, N-phenyl-2-naphthylamine, 2,4,6-trimethylaniline, 4-methoxyaniline, 4-aminobenzenethiol, formanilide, p-xylenediamine, m-xylenediamine, 4-methylbenzylamine, N-methylbenzylamine, N,N-dimethylbenzylamine, N,N-diethylbenzylamine, N-tert-butylbenzylamine, N-isopropylbenzylamine, 4-aminobenzylamine, (S)-(−)-1-phenylethylamine, (R)-(+)-1-phenylethylamine, N-ethylbenzylamine, benzamide, 4-(1-aminoethyl) toluene, 4-fluorobenzylamine, chlorobenzylamine, 4-methylbenzamide, isophthalamide, N-ethyl-N-methylbenzylamine, 2-aminobenzylamine, 4-(aminomethyl)benzoic acid, tribenzylamine, 4-aminobenzamide, 2-chlorobenzamide, 4-chlorobenzamide, 2,4-dichlorobenzamide, N-benzylacetamide, N,N-dimethylbenzamide, 4-fluorobenzamide, and 1-(2,4-dichlorophenyl)ethylamine. As the surface treatment agent used in the present invention, only one of these compounds may be used, or a plurality of compounds may be used.

In particular, it is preferable that the compound represented by the general formula (1) be a compound selected from the group consisting of compounds represented by the following formulae (2) to (5). That is, 3-chloroaniline represented by the following formula (2), benzylamine represented by the following formula (3), 2-phenylethylamine represented by the following formula (4), 1-naphthylamine represented by the following formula (5), and neutralized salts thereof can be mentioned as particularly preferable surface treatment agents.

[Chemical Formula 4]

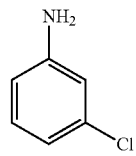

(2)

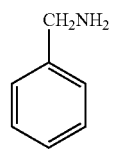

(3)

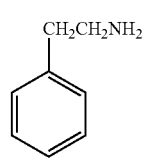

(4)

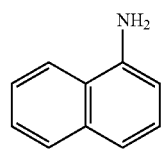

(5)

An acid that forms a neutralized salt with the compound represented by the general formula (1) is not particularly limited, and examples thereof include sulfuric acid, nitric acid, phosphoric acid, formic acid, acetic acid, propionic acid, oxalic acid, boric acid, hydrofluoric acid, hydrochloric acid, hydrobromic acid, and hydroiodic acid. In particular, hydrochloric acid, hydrobromic acid, and hydroiodic acid are preferable from the viewpoint that they cause less side reactions, have high stability, and are easy to handle.

In the present invention, the phrase that "the surface treatment agent is attached to the graphene" means that the surface treatment agent remains in the surface-treated graphene after a washing step of dispersing the surface-treated graphene in 100 times as much (in mass ratio) water and filtering the resulting dispersion liquid is repeated five or more times, and then the surface-treated graphene is dried by a method such as freeze drying or spray drying. The residual surface treatment agent can be confirmed, in the measurement of the dried surface-treated graphene by time-of-flight secondary ion mass spectrometry (TOF-SIMS), by means of the detection of surface treatment agent molecules in the form of protonated molecules in positive secondary ion spectra. When the surface treatment agent is a neutralized salt, the surface treatment agent molecules can be detected in the form of protonated molecules from which anion molecules have been removed.

In the surface-treated graphene of the present invention, it is preferable that 3% by mass or more and 50% by mass or less, relative to the graphene, of the compound represented by the general formula (1) or a neutralized salt thereof be attached to the graphene. If the amount of the compound represented by the general formula (1) or a neutralized salt thereof, that is, the amount of the surface treatment agent is too small, it is impossible to impart sufficient dispersibility to the surface-treated graphene. On the other hand, if the amount of the surface treatment agent is too large, the electric conductivity of the surface-treated graphene tends to decrease. The amount of the surface treatment agent is more preferably 5% by mass or more, still more preferably 7% by mass or more relative to the graphene. In addition, the amount of the surface treatment agent is more preferably 30% by mass or less, still more preferably 25% by mass or less.

Since the surface treatment agent used in the present invention contains nitrogen atoms, the amount (in % by mass) of the attached surface treatment agent can be calculated using (a) the amount (in % by mass) of nitrogen measured by X-ray photoelectron spectroscopy, (b) the molecular weight of the surface treatment agent, and (c) the formula mass of nitrogen in a surface treatment agent molecule using the following formula (6). The amount (in % by mass) of nitrogen (a) can be calculated as the ratio of a value obtained by multiplying the atomic percentage of nitrogen measured by X-ray photoelectron spectroscopy by the atomic weight of nitrogen to the sum of values obtained by multiplying the atomic percentage of each of all the elements including nitrogen similarly measured by X-ray photoelectron spectroscopy by the atomic weight of the element.

$$\text{Amount (in \% by mass) of attached surface treatment agent} = (a \times b \div c) \div (100 - a \times b \div c) \times 100 \quad (6)$$

In the X-ray photoelectron spectroscopy, the surface-treated graphene is introduced into a measurement chamber having a high vacuum chamber, a surface of a sample placed in an ultra-high vacuum is irradiated with soft X-rays, and photoelectrons emitted from the surface are detected with an analyzer. The photoelectrons are measured by wide scan and narrow scan, and the value of binding energy of bound electrons in the substance is obtained to acquire elemental information on the substance surface. Furthermore, the chemical structure of the surface treatment agent contained in the surface-treated graphene can be specified by TOF-SIMS. Incidentally, the surface treatment agent is quantitatively determined using a sample obtained by repeating a washing step of dispersing the surface-treated graphene in 100 times as much (in mass ratio) water and filtering the resulting dispersion liquid five or more times, and then freeze-drying the surface-treated graphene.

The technique for attaching the surface treatment agent to the graphene is not particularly limited, and it is possible to directly mix the surface treatment agent with the graphene, or to mix the surface treatment agent with graphene oxide and then reduce the graphene oxide.

The technique for mixing the surface treatment agent with the graphene or graphene oxide is not particularly limited, and a known mixer or kneader can be used. More specifically, there can be mentioned a method using an automatic mortar, a three-roll, a bead mill, a planetary ball mill, a homogenizer, a homodisper, a homomixer, a planetary mixer, a twin-screw kneader or the like. Among them, a homogenizer, a homodisper, a homomixer, a planetary mixer, and a twin-screw kneader are suitable.

The surface-treated graphene of the present invention preferably has a specific surface area as measured by a BET measurement method (hereinafter sometimes simply referred to as the "specific surface area") of 80 $m^2/g$ or more and 250 $m^2/g$ or less. The specific surface area of the graphene reflects the thickness and the degree of peeling of the graphene, and the larger the specific surface area is, the thinner the graphene is and the higher the degree of peeling is. If the specific surface area of the graphene is less than 80 $m^2/g$, it tends to be difficult to form a conductive network, whereas if the specific surface area exceeds 250 $m^2/g$, dispersibility tends to deteriorate. The specific surface area of the graphene is more preferably 100 $m^2/g$ or more, still more preferably 130 $m^2/g$ or more. Likewise, the specific surface area of the graphene is preferably 200 $m^2/g$ or less, more preferably 180 $m^2/g$ or less. The surface-treated graphene is subjected to the BET measurement method according to the method described in JIS Z 8830: 2013. The measurement of the adsorption gas quantity is performed by a carrier gas method, and the analysis of the adsorption data is performed by a single point method.

The surface-treated graphene of the present invention preferably has an element ratio of oxygen to carbon (O/C ratio) of 0.05 or more and 0.40 or less as measured by X-ray photoelectron spectroscopy.

When the surface-treated graphene of the present invention is measured by X-ray photoelectron spectroscopy, a C1s peak derived from carbon is detected near 284 eV. It is known that the peak shifts to the high energy side when carbon is bonded to oxygen. More specifically, peaks based on a C—C bond, a C=C double bond, and a C—H bond in which carbon is not bonded to oxygen do not shift and are detected near 284 eV, whereas peaks based on a C—O single bond, a C=O double bond, and a COO bond shift to positions near 286.5 eV, 287.5 eV, and 288.5 eV, respectively. Therefore, signals derived from carbon are detected in the form in which peaks near 284 eV, near 286.5 eV, near 287.5 eV, and near 288.5 eV are overlapped. At the same time, an N1s peak derived from nitrogen is detected near 402 eV, and an O1s peak derived from oxygen is detected near 533 eV. Furthermore, the O/C ratio can be obtained from the peak areas of the C1s peak and the O1s peak.

The oxygen atoms on the surface of the surface-treated graphene are acidic groups bonded to the graphene itself and oxygen atoms contained in the surface treatment agent attached to the surface of the graphene. Such an acidic group has an effect of improving the dispersion state of the surface-treated graphene. If the number of acidic groups on the surface of the surface-treated graphene is too small, the dispersibility is deteriorated, whereas if the number of acidic groups is too large, the electric conductivity is decreased and the performance as a conductive aid is deteriorated. The O/C ratio of the surface-treated graphene is preferably 0.07 or more, more preferably 0.09 or more, still more preferably 0.10 or more. Likewise, the O/C ratio is preferably 0.30 or less, more preferably 0.20 or less, still more preferably 0.15 or less.

The O/C ratio of the surface-treated graphene can be controlled by changing the degree of oxidation of the graphene oxide as a raw material or by changing the amount of the surface treatment agent. The higher the degree of oxidation of the graphene oxide is, the larger the amount of oxygen remaining after the reduction is, whereas the lower the degree of oxidation is, the smaller the amount of oxygen atoms after the reduction is.

The surface-treated graphene of the present invention preferably has an element ratio of nitrogen to carbon (N/C ratio) of 0.005 or more and 0.020 or less as measured by X-ray photoelectron spectroscopy. The N/C ratio is preferably 0.008 or more and 0.015 or less. The nitrogen atoms on the surface of the surface-treated graphene are derived from nitrogen contained in the surface treatment agent used in the present invention. If the N/C ratio of the graphene exceeds 0.020, the graphene tends to have low electric conductivity because nitrogen atoms substitute for the graphene conjugated structure. Note that the N/C ratio can be obtained from the peak areas of the C1s peak and the N1s peak similarly to the O/C ratio.

When the surface-treated graphene of the present invention is dispersed in an organic solvent and used as a surface-treated graphene/organic solvent dispersion liquid, the dispersion method is not particularly limited, and preferable examples of the dispersion method include those employing a thin film turning method, a rotor/stator method, and a media mill method. Examples of apparatuses used in the dispersion include a planetary mixer (INOUE MFG., INC.) and a homodisper (PRIMIX Corporation). FILMIX (registered trademark) model 30-30 (PRIMIX Corporation), CLEARMIX (registered trademark) CLM-0.8S (M Technique Co., Ltd.), LABSTAR (registered trademark) mini LMZ015 (Ashizawa Finetech Ltd.), and SUPER SHEAR MIXER SDRT 0.35-0.75 (SATAKE CHEMICAL EQUIPMENT MFG., LTD.) are more preferable.

<Method for Producing Surface-Treated Graphene>

The method for producing a surface-treated graphene of the present invention includes mixing graphene oxide with a compound represented by the following general formula (1) or a neutralized salt thereof, and subsequently includes a reduction step of subjecting the graphene oxide to reduction treatment:

[Chemical Formula 5]

(1)

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

That is, the surface-treated graphene of the present invention can be produced by a production method including mixing graphene oxide with the surface treatment agent used in the present invention, and then subjecting the graphene oxide to reduction treatment. Suitable aspects of the compound represented by the general formula (1) are as described above.

[Graphene Oxide]

There is no particular limitation on the method for producing graphene oxide, and a known method such as the Hummers method can be used. Alternatively, commercially available graphene oxide may be, purchased. As a method for producing graphene oxide, a case where the Hummers method is used will be described below as an example.

While graphite (black lead powder) and sodium nitrate put in concentrated sulfuric acid are stirred, potassium permanganate is gradually added to the mixture so as not to raise the temperature, and the mixture is reacted with stirring at 25 to 50° C. for 0.2 to 5 hours. Then, ion exchanged water is added to the mixture to dilute the mixture into a suspension, and the suspension is reacted at 80 to 100° C. for 5 to 50 minutes. Finally, hydrogen peroxide and deionized water are added to the suspension, and the mixture is reacted for 1 to 30 minutes to give a graphene oxide dispersion liquid. The obtained graphene oxide dispersion liquid is filtered and washed to give a graphene oxide gel. The graphene oxide gel may be diluted, and mixed with a surface treatment agent or subjected to reduction treatment.

Graphite as a raw material of graphene oxide may be either artificial graphite or natural graphite, but is preferably natural graphite. The number of meshes of graphite as a raw material is preferably 20,000 or less, more preferably 5,000 or less.

The proportions of reactants are, for example, 150 to 300 ml of concentrated sulfuric acid, 2 to 8 g of sodium nitrate, 10 to 40 g of potassium permanganate, and 40 to 80 g of hydrogen peroxide relative to 10 g of graphite. During the addition of sodium nitrate and potassium permanganate, an ice bath is used to control the temperature. At the time of addition of hydrogen peroxide and deionized water, the mass of deionized water is 10 to 20 times the mass of hydrogen peroxide. The used concentrated sulfuric acid preferably has a mass content of sulfuric acid of 70% or more, more preferably 97% or more.

Although graphene oxide has high dispersibility, graphene oxide itself is insulative and cannot be used as a conductive aid or the like. If the degree of oxidation of graphene oxide is too high, the graphene obtained by reduction of the graphene oxide may have low electric conductivity. Therefore, the ratio of carbon atoms to oxygen atoms in graphene oxide measured by X-ray photoelectron spectroscopy is preferably 0.5 or more. Graphene oxide is measured by X-ray photoelectron spectroscopy in a state where the solvent is sufficiently dried.

In addition, unless graphite is oxidized to the inside, a flaky graphene is hardly obtained after the reduction. Therefore, it is desirable that no peak specific to graphite is detected when graphene oxide is dried and subjected to X-ray diffraction measurement.

The degree of oxidation of graphene oxide can be adjusted by changing the amount of the oxidizing agent used in the oxidation reaction of graphite. More specifically, the larger the amounts of sodium nitrate and potassium permanganate relative to graphite used in the oxidation reaction are, the higher the degree of oxidation is, whereas the smaller the amounts are, the lower the degree of oxidation is. The mass ratio of sodium nitrate to graphite is not particularly limited, but it is preferably 0.200 or more and 0.800 or less, more preferably 0.250 or more and 0.500 or less, still more preferably 0.275 or more and 0.425 or less. The ratio of potassium permanganate to graphite is not particularly limited, but it is preferably 1.00 or more, more preferably 1.40 or more, still more preferably 1.65 or more. Further, the ratio is preferably 4.00 or less, more preferably 3.00 or less, still more preferably 2.55 or less.

[Surface Treatment Agent Mixing Step]

Then, graphene oxide is mixed with the surface treatment agent. As the surface treatment agent, the above-mentioned ones are used. The method for mixing graphene oxide with the surface treatment agent is not particularly limited, and a planetary mixer (INOUE MFG., INC.), a homodisper (PRIMIX Corporation), FILMIX (PRIMIX Corporation) and the like can be used.

In order to mix graphene oxide with the surface treatment agent well, it is preferable to mix them in a state where both the graphene oxide and the surface treatment agent are dispersed in an aqueous solution. In this case, it is preferable that both the graphene oxide and the surface treatment agent are completely dissolved, but a part of the graphene oxide and the surface treatment agent may be dispersed as a solid without being dissolved. The aqueous solution may partially contain a solvent other than water. The solvent other than water is not particularly limited, but a polar solvent is preferable, and examples thereof include ethanol, methanol, 1-propanol, 2-propanol, N-methylpyrrolidone, dimethylformamide, dimethylacetamide, dimethylsulfoxide, γ-butyrolactone, and mixtures of the above-mentioned compounds.

[Pulverization Step]

If necessary, treatment for pulverizing graphene oxide may be performed before the reduction step and before or after the surface treatment agent mixing step. The pulverization treatment can reduce the size of the graphene obtained after the reduction. The solvent used in the pulverization step may be the same solvent as that described in the surface treatment agent mixing step. The technique for pulverizing graphene oxide is not particularly limited, and examples of the techniques include a technique of applying ultrasonic waves to a graphene oxide dispersion liquid, a technique of colliding a pressurized graphene oxide dispersion liquid with ceramic balls, and a technique of dispersing pressurized graphene oxide dispersion liquids by colliding the dispersion liquids with each other using a liquid-liquid shear type wet jet mill. It is possible to adjust the size of the graphene obtained after the reduction depending on the type of the pulverization treatment, treatment conditions, and treatment time.

[Reduction Step]

Then, a reduction step of reducing graphene oxide in a solvent is performed to give a surface-treated graphene/water dispersion liquid. In the case where the above-mentioned surface treatment agent mixing step, is performed in a solvent, it is preferable to directly proceed to the reduction step in the state after completion of the surface treatment agent mixing step or to dilute the graphene oxide dispersion liquid with the same solvent as the solvent used in the surface treatment agent mixing step and reduce graphene oxide.

The method for reducing graphene oxide is not particularly limited, but chemical reduction is preferable. In the case where chemical reduction is employed, examples of the reducing agent include an organic reducing agent and an inorganic reducing agent. An inorganic reducing agent is more preferable from the viewpoint of ease of washing after the reduction.

Examples of the organic reducing agent include an aldehyde reducing agent, a hydrazine derivative reducing agent, and an alcohol reducing agent. Among them, an alcohol reducing agent is particularly suitable because it can reduce graphene oxide relatively mildly. Examples of the alcohol reducing agent include methanol, ethanol, propanol, isopropyl alcohol, butanol, benzyl alcohol, phenol, ethanolamine, ethylene glycol, propylene glycol, and diethylene glycol.

Examples of the inorganic reducing agent include sodium dithionite, potassium dithionite, phosphorous acid, sodium borohydride, and hydrazine. Among them, sodium dithionite and potassium dithionite are suitably used because they are low in toxicity and take short time for the reaction, and can also reduce graphene oxide while holding a relatively large number of acidic groups, so that a graphene having high dispersibility in a solvent can be produced.

[Washing Step]

In the stage after the reduction step and before the drying step, a washing step of diluting the surface-treated graphene/water dispersion liquid with a solvent and, filtering the resulting diluted liquid may be performed for the purpose of removing the reducing agent. The solvent used in the washing step may be the same solvent as that described in the surface treatment agent mixing step.

[Drying Step]

The surface-treated graphene/water dispersion liquid after the reduction step or the washing step is subjected to drying treatment to remove the solvent, whereby the surface-treated graphene of the present invention can be obtained. The drying method is not particularly limited, but freeze drying or spray drying can be suitably used.

<Surface-Treated Graphene/Organic Solvent Dispersion Liquid>

The surface-treated graphene/organic solvent dispersion liquid of the present invention contains an organic solvent and the surface-treated graphene of the present invention dispersed in the organic solvent. That is, the surface-treated graphene/organic solvent dispersion liquid of the present invention is a dispersion liquid containing the surface-treated graphene of the present invention in a state of being dispersed in an organic solvent. Examples of the organic solvent in which the graphene is dispersed include 1-propanol, 2-propanol, N-methylpyrrolidone, γ-butyrolactone, dimethylacetamide, dimethylformamide, dimethylsulfoxide, acetonitrile, γ-butyrolactone, and mixtures of the above-mentioned compounds.

The surface-treated graphene/organic solvent dispersion liquid of the present invention preferably has a solid content of 0.3% by mass or more and 40% by mass or less. The solid content is more preferably 20% by mass or less, still more preferably 10% by mass or less, even more preferably 7% by mass or less, particularly preferably 5% by mass or less. In addition, the solid content is more preferably 0.7% by mass or more, still more preferably 1% by mass or more. When the solid content is 5% by mass or less, the surface-treated graphene/organic solvent dispersion liquid tends to have fluidity and is excellent in the handling properties. If the solid content exceeds 40% by mass, graphene stacking tends to occur in the dispersion liquid, and a good dispersion state is hardly maintained. If the solid content is less than 0.3% by mass, in the case where the surface-treated graphene/organic solvent dispersion liquid is used in the production of an electrode paste, the electrode paste tends to be poor in coatability since the electrode paste has a low solid content due to the solvent in the dispersion liquid and has low viscosity.

The solid content of the surface-treated graphene/organic solvent dispersion liquid can be calculated by measuring the mass of the surface-treated graphene/organic solvent dispersion liquid after drying the solvent in the dispersion liquid, and dividing the measured value by the mass of the surface-treated graphene/organic solvent dispersion liquid itself. More specifically, about 1 g of the surface-treated graphene/organic solvent dispersion liquid is attached to a glass substrate having a known mass, the glass substrate is heated on a hot plate temperature-controlled to 120° C., for 1.5 hours to volatilize the solvent, and the mass of the remaining graphene is measured.

<Method for Producing Surface-Treated Graphene/Organic Solvent Dispersion Liquid>

The method for producing a surface-treated graphene/organic solvent dispersion liquid of the present invention includes mixing graphene oxide with a compound represented by the following general formula (1) in a state where the graphene oxide and the compound are dispersed in a solvent, and then subjecting the graphene oxide to reduction treatment, and further includes an organic solvent substitution step of substituting the solvent with an organic solvent:

[Chemical Formula 6]

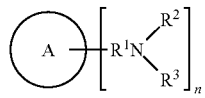

$$A \!-\!\!\left[\!-\!R^1N\!\!\begin{array}{c}R^2\\R^3\end{array}\!\right]_n \quad (1)$$

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

Suitable aspects of the compound represented by the general formula (1) are as described above.

The surface-treated graphene/organic solvent dispersion liquid of the present invention can be produced by a production method including an organic solvent substitution step in which the solvent of the surface-treated graphene/water dispersion liquid after the reduction step or after the washing step is substituted with an organic solvent without the surface-treated graphene/water dispersion liquid being subjected to the drying step. Examples of the organic solvent for substituting for the solvent of the surface-treated graphene/water dispersion liquid include 1-propanol, 2-propanol, N-methylpyrrolidone, γ-butyrolactone, dimethylacetamide, dimethylformamide, dimethylsulfoxide, acetonitrile, γ-butyrolactone, and mixtures of the above-mentioned compounds. The organic solvent used in substitution may partially contain water. It is particularly effective to perform both the organic solvent substitution treatment and the peeling treatment by shearing without drying the graphene for dispersing the graphene in the organic solvent well, because once the surface-treated graphene/organic solvent dispersion liquid is dried, the graphene layers are strongly aggregated with each other.

The organic solvent substitution step is preferably a step of mixing a solvent dispersion liquid of the graphene having undergone the reduction step with an organic solvent, and then partially removing the solvent by suction filtration or distillation. In the case of a means for solvent removal with which strong force is applied to the graphene contained in the dispersion liquid, such as pressing filtration or centrifugal separation, graphene stacking tends to occur. The suction filtration is preferably vacuum suction filtration. In order to reduce the residual content of the solvent used in the reduction step, this operation may be repeated a plurality of times. In addition, in the stage after the reduction step and before the organic solvent substitution step, a washing step of diluting the surface-treated graphene/water dispersion liquid with water and filtering the resulting diluted liquid may be performed for the purpose of removing the reducing agent.

In the organic solvent substitution step, the mixing ratio at the time of mixing the surface-treated graphene/water dispersion liquid having undergone the reduction step with the organic solvent is not particularly limited. However, if the amount of the mixed organic solvent is too small, the liquid mixture is viscous and difficult to handle, whereas if the amount of the mixed organic solvent is too large, the amount of the graphene per unit treatment amount is small, so that the treatment efficiency is poor. From the viewpoint of obtaining a low-viscosity dispersion liquid that is easy to handle and improving the treatment efficiency, the amount of the mixed organic solvent is preferably 10 to 3000 parts by mass, more preferably 20 to 2000 parts by mass, still more preferably 50 to 1500 parts by mass based on 100 parts by mass of the solvent dispersion liquid of the graphene having undergone the reduction step.

The method for mixing the surface-treated graphene/water dispersion liquid with the organic solvent is not particularly limited, and a planetary mixer (INOUE MFG., INC.), a homodisper (PRIMIX Corporation), FILMIX (PRIMIX Corporation) and the like can be used.

In the case where the graphene is present in a dispersion liquid in a state of being dispersed in an organic solvent after the reduction step due to use of the organic solvent as a solvent for the reduction step, the organic solvent substitution step is not indispensable.

[Strong Stirring Step]

In the method for producing a surface-treated graphene/organic solvent dispersion liquid of the present invention, it is preferable that in the organic solvent substitution step, at any stage before final solvent removal, a strong stirring step be performed, the strong stirring step being a step of stirring a surface-treated graphene/water dispersion liquid and the organic solvent in a mixed state with a high shear mixer at a shear rate of 5,000 $sec^{-1}$ to 50,000 $sec^{-1}$. In the case where the organic solvent substitution step is not performed due to use of an organic solvent as a solvent for the reduction step, the surface-treated graphene/organic solvent dispersion liquid after the reduction step may be directly subjected to the strong stirring step. Peeling graphene with a high shear mixer in the strong stirring step can eliminate graphene stacking.

As described above, the shear rate in the strong stirring step is preferably set to 5,000 $sec^{-1}$ to 50,000 $sec^{-1}$. If the shear rate is too low, the graphene is unlikely to be peeled and the degree of peeling of the graphene is low. On the other hand, if the shear rate is too high, the degree of peeling of the graphene is too high and the dispersibility is deteriorated. The shear rate is more preferably 10,000 $sec^{-1}$ or more, more preferably 15,000 $sec^{-1}$ or more, particularly preferably 20,000 $sec^{-1}$ or more. Likewise, the shear rate is more preferably 45,000 $sec^{-1}$ or less, still more preferably 40,000 $sec^{-1}$ or less. The treatment time in the strong stirring step is preferably 15 seconds to 300 seconds, more preferably 20 seconds to 120 seconds, still more preferably 30 seconds to 80 seconds.

As the high shear mixer used in the strong stirring step, it is preferable to use a mixer employing a thin film turning method, a rotor/stator method, and a media mill method. Examples of such a mixer include FILMIX (registered trademark) model 30-30 (PRIMIX Corporation), CLEARMIX (registered trademark) CLM-0.8S (M Technique Co., Ltd.), LABSTAR (registered trademark) mini LMZ015

(Ashizawa Finetech Ltd.), and SUPER SHEAR MIXER SDRT 0.35-0.75 (SATAKE CHEMICAL EQUIPMENT MFG., LTD.).

<Surface-Treated Graphene/Electrode Active Material Composite Particles>

The surface-treated graphene/electrode active material composite particles of the present invention contain a composite of the surface-treated graphene of the present invention and electrode active material particles.

Applications of the surface-treated graphene and the surface-treated graphene/organic solvent dispersion liquid of the present invention are not limited. As an example, the surface-treated graphene and the surface-treated graphene/organic solvent dispersion liquid are advantageously used in making a composite of a graphene with electrode active material particles such as electrode active material particles for a lithium ion battery. As used herein, "making a composite" means to maintain a state in which a graphene is in contact with a surface of electrode active material particles. Examples of an aspect of a composite include a composite obtained by integrally granulating a graphene and electrode active material particles, and a composite obtained by attaching a graphene to a surface of electrode active material particles.

The active material used in the production of the surface-treated graphene/electrode active material composite particles may be either a positive electrode active material or a negative electrode active material. That is, the surface-treated graphene and the surface-treated graphene/organic solvent dispersion liquid of the present invention can be used in both the production of a positive electrode and the production of a negative electrode. When used in electrode active material particles for a lithium ion battery, the positive electrode active material is not particularly limited. Examples thereof include lithium cobaltate ($LiCoO_2$), lithium nickelate ($LiNiO_2$), spinel type lithium manganate ($LiMn_2O_4$), a ternary system in which cobalt is partially substituted with nickel and manganese ($LiMn_xNi_yCo_{1-x-y}O_2$), a composite oxide of lithium and a transition metal, such as spinel type lithium manganate ($LiMn_2O_4$), an olivine type (phosphate) active material such as lithium iron phosphate ($LiFePO_4$), metal oxides such as $V_2O_5$, and metal compounds such as $TiS_2$, $MoS_2$, and $NbSe_2$. The negative electrode active material is not particularly limited, and examples thereof include carbonaceous materials such as natural graphite, artificial graphite, and hard carbon, silicon compounds containing SiO, SiC, SiOC or the like as basic elements, lithium titanate ($Li_4Ti_5O_{12}$), and metal oxides capable of undergoing conversion reaction with lithium ions, such as manganese oxide (MnO) and cobalt oxide (CoO).

The surface-treated graphene/electrode active material composite particles can be produced, for example, by mixing the surface-treated graphene or the surface-treated graphene/organic solvent dispersion liquid of the present invention with active material particles, and then drying the resulting mixture by a technique such as spray drying or freeze drying. Examples of a method for mixing the surface-treated graphene or the surface-treated graphene/organic solvent dispersion liquid with active material particles include methods using a three-roll, a wet bead mill, a wet planetary ball mill, a homogenizer, a planetary mixer, a twin-screw kneader or the like.

<Method for Producing Electrode Paste>

The electrode paste of the present invention contains the surface-treated graphene of the present invention, electrode active material particles, and a binder.

The surface-treated graphene and the surface-treated graphene/organic solvent dispersion liquid of the present invention can also be used in the production of an electrode paste used in the production of electrodes for a lithium ion battery and the like. That is, an electrode paste can be prepared by mixing an electrode active material, a binder, and the surface-treated graphene or the surface-treated graphene/organic solvent dispersion liquid of the present invention as a conductive aid, as well as an appropriate amount of a solvent as required.

The electrode active material used in the production of the electrode paste for a lithium ion battery may be the same active material as that described in the method for producing the surface-treated graphene/active material composite particles.

The binder is not particularly limited, and examples thereof include fluoropolymers such as polyvinylidene fluoride (PVDF) and polytetrafluoroethylene (PTFE), rubbers such as styrene butadiene rubber (SBR) and natural rubber, polysaccharides such as carboxymethyl cellulose, a polyimide precursor and/or a polyimide resin, a polyamide imide resin, a polyamide resin, a polyacrylic acid, sodium polyacrylate, an acrylic resin, and polyacrylonitrile. These may be used as a mixture of two or more compounds.

The conductive aid may be the surface-treated graphene of the present invention or the surface-treated graphene contained in the surface-treated graphene/organic solvent dispersion liquid of the present invention alone, or an additional conductive aid may be further added. The additional conductive aid is not particularly limited, and examples thereof include carbon blacks such as furnace black, Ketjen black (registered trademark), and acetylene black, graphites such as natural graphite (such as scaly graphite) and artificial graphite, conductive fibers such as carbon fibers and metal fibers, and metal powders of copper, nickel, aluminum, silver and the like.

Examples of the additionally used solvent include NMP, γ-butyrolactone, water, and dimethylacetamide, and NMP is most preferably used.

EXAMPLES

Measurement Example 1: Measurement by X-Ray Photoelectron Spectroscopy

The X-ray photoelectron spectroscopy measurement of each sample was performed with Quantera SXM (manufactured by ULVAC-PHI, Inc.). The excited X-ray was monochromatic Al Kα 1, 2 rays (1486.6 eV), the X-ray diameter was 200 μm, and the photoelectron escape angle was 45°. The C1s main peak originating from carbon atoms was assigned to 284.3 eV, the O1s peak originating from oxygen atoms was assigned to a peak near 533 eV, the N1s peak originating from nitrogen atoms was assigned to a peak near 402 eV, and the O/C ratio and the N/C ratio were determined from the area ratios between the peaks. The measurement was performed on surface-treated graphenes produced in the following examples, which were obtained by repeating the washing step of filtering the surface-treated graphene/water dispersion liquid after the reduction with a suction filter and then diluting the filtrate to 0.5% by mass with water and subjecting the diluted liquid to suction filtration five times, and further freeze-drying the resulting product.

Measurement Example 2: Amount of Attached Surface Treatment Agent

The amount (in % by mass) of the attached surface treatment agent was calculated using (a) the amount (in % by mass) of nitrogen measured by X-ray photoelectron spectroscopy in Measurement Example 1, (b) the molecular weight of the surface treatment agent, and (c) the formula mass of nitrogen in a surface treatment agent molecule using the following formula (6).

$$\text{Amount (in \% by mass) of attached surface treatment agent} = (a \times b \div c) \div (100 - a \times b \div c) \times 100 \quad (6)$$

Measurement Example 3: Evaluation of Specific Surface Area (BET Measurement Method)

The specific surface area of the graphene was measured with HM Model-1210 (manufactured by Macsorb). The measurement was performed according to JIS Z 8830: 2013. The measurement of the adsorption gas quantity was performed by a carrier gas method, and the analysis of the adsorption data was performed by a single point method. The degassing conditions were 100° C.×180 minutes. The measurement was performed on surface-treated graphenes prepared in the following examples, which were obtained by repeating the washing step of filtering the surface-treated graphene/water dispersion liquid after the reduction with a suction filter and then diluting the filtrate to 0.5% by mass with water and subjecting the diluted liquid to suction filtration five times; and further freeze-drying the resulting product.

Measurement Example 4: Solid Content

The surface-treated graphene/organic solvent dispersion liquid was attached to a glass substrate having a known mass, the mass was measured, and the glass substrate was heated on a hot plate temperature-controlled to 120° C. for 1.5 hours to volatilize the solvent. The solid content of the surface-treated graphene/organic solvent dispersion liquid was measured from the amount of the attached surface-treated graphene/organic solvent dispersion liquid before the heating and the amount of the volatilized solvent calculated from the mass difference before and after the heating. The measurement was repeated three times, and the average was obtained.

Measurement Example 5: Thickness of Graphene

The surface-treated graphene/organic solvent dispersion liquid or the surface-treated graphene was diluted to 0.002% by mass using NMP. In the dilution, the surface-treated graphene was treated with FILMIX (registered trademark) model 30-30 (PRIMIX Corporation) at a rotation speed of 40 m/s (shear rate: 20,000 sec$^{-1}$) for 60 seconds. The diluted liquid was dropped on a mica substrate, and dried so that the diluted liquid would attach to the substrate. The graphene on the substrate was observed with an atomic force microscope (Dimension Icon; Bruker), and thicknesses of randomly selected 50 pieces of the graphene were measured and the average was obtained. When there was variation in thickness in one piece, the area average was calculated.

Measurement Example 6: Size of Graphene in Plane Direction

The surface-treated graphene/organic solvent dispersion liquid or the surface-treated graphene was diluted to 0.002% by mass using an NMP solvent. In the dilution, the surface-treated graphene was treated with FILMIX (registered trademark) model 30-30 (PRIMIX Corporation) at a rotation speed of 40 m/s (shear rate: 20,000 sec$^{-1}$) for 60 seconds. The diluted liquid was dropped on a glass substrate, and dried so that the diluted liquid would attach to the substrate. The graphene on the substrate was observed with a laser microscope VK-X250 manufactured by Keyence Corporation, and the length of the longest part (long diameter) and the length of the shortest part (short diameter) of randomly selected 50 small pieces of the graphene were measured, and the average of 50 values that are each obtained by (long diameter+short diameter)/2 was obtained.

Measurement Example 7: Cyclic Voltammetry Measurement

Cyclic voltammetry (CV) measurement was performed as follows if not otherwise specified in each of the examples and comparative examples.

In FILMIX (registered trademark) model 30-30 (PRIMIX Corporation), a blend of 2 parts by mass of the surface-treated graphene prepared in each of the examples and comparative examples and 98 parts by mass of NMP was treated at a rotation speed of 40 m/s (shear rate: 20,000 sec$^{-1}$) for 60 seconds to give a dispersion liquid. The dispersion liquid or the surface-treated graphene/organic solvent dispersion liquid prepared in each of the examples and comparative examples in an amount of 80 parts by mass in terms of graphene solid content and 20 parts by mass of polyvinylidene fluoride as a binder were blended, NMP was added as a solvent, and the overall solid content of the blend was adjusted to 26% by mass. The blend was treated with Awatori Rentaro (registered trademark) ARE-310 (THINKY CORPORATION) at 2000 rpm for 5 minutes to give an electrode paste.

The electrode paste produced from the surface-treated graphene/organic solvent dispersion liquid or the surface-treated graphene was applied to an aluminum foil piece (thickness: 18 μm) using a doctor blade (100 μm), dried at 80° C. for 15 minutes, and vacuum-dried at 120° C. for 2 hours to give an electrode plate.

The produced electrode plate was cut to have a diameter of 15.9 mm to give a positive electrode, and a negative electrode made of metal lithium was used as a counter electrode. A 2032 type coin cell was produced using Celgard #2400 (manufactured by Celgard, LLC) cut to have a diameter of 17 mm as a separator and a solvent containing 1 M LiPF6 and having a ratio of ethylene carbonate:diethyl carbonate of 7:3 as an electrolytic solution.

CV measurement was performed using the produced coin cell. The CV measurement conditions were a potential range of 2.0 V to 5.0 V (vs Li/Li$^+$) and a sweep rate of 1 mV/sec. In the first cycle, the potential was swept from the OCV in the positive potential direction, and the potential when the current value reached 2.0×10$^{-5}$ A/cm$^2$ was taken as the oxidation potential.

Measurement Example 8: Battery Performance Evaluation

The discharge capacity was measured as follows if not otherwise specified in each of the examples and comparative examples.

In FILMIX (registered trademark) model 30-30 (PRIMIX Corporation), a blend of 2 parts by mass of the surface-treated graphene prepared in each of the examples and comparative examples and 98 parts by mass of NMP was treated at a rotation speed of 40 m/s (shear rate: 20,000/sec) for 60 seconds to give a dispersion liquid. The dispersion liquid in an amount of 0.75 parts by mass in terms of graphene solid content, 97 parts by mass of $LiNi_{0.5}Co_{0.2}Mn_{0.3}O_2$ as an electrode active material, 0.75 parts by mass of acetylene black as an additional conductive aid, 1.5 parts by mass of polyvinylidene fluoride as a binder, and 40 parts by mass of NMP as a solvent were blended, and the blend was mixed using a planetary mixer to give an electrode paste.

The surface-treated graphene/organic solvent dispersion liquid prepared in each of the examples and comparative examples in an amount of 0.75 parts by mass in terms of graphene solid content, 97 parts by mass of $LiNi_{0.5}Co_{0.2}Mn_{0.3}O_2$ as an electrode active material, 0.75 parts by mass of acetylene black as an additional conductive aid, 1.5 parts by mass of polyvinylidene fluoride as a binder, and 60 parts by mass of NMP as a solvent were blended, and the blend was mixed using a planetary mixer to give an electrode paste.

The electrode paste produced from the surface-treated graphene/organic solvent dispersion liquid or the surface-treated graphene was applied to an aluminum foil piece (thickness: 18 μm) using a doctor blade (300 μm), dried at 80° C. for 15 minutes, and vacuum-dried at 120° C. for 2 hours to give an electrode plate.

The produced electrode plate was cut to have a diameter of 15.9 mm to give a positive electrode, and a negative electrode made of 98 parts by mass of graphite, 1 part by mass of sodium carboxymethyl cellulose, and 1 part by mass of a SBR aqueous dispersion was cut to have a diameter of 16.1 mm and used as a counter electrode. A 2032 type coin cell was produced using Celgard #2400 (manufactured by Celgard, LLC) cut to have a diameter of 17 mm as a separator and a solvent containing 1 M LiPF6 and having a ratio of ethylene carbonate:diethyl carbonate of 7:3 as an electrolytic solution. Charge and discharge measurements were made at an upper limit voltage of 4.2 V and a lower limit voltage of 3.0 V 500 times in total, that is, three times each at the rates of 0.1 C, 1 C, and 5 C in this order, and then 491 times at the rate of 1 C. The discharge capacities in the third measurement at the rate of 1 C, the third measurement at the rate of 5 C, and then the 491th measurement at the rate of 1 C (the 500th measurement in all) were measured.

Synthesis Example 1: Method for Preparing Graphene Oxide Gel

Using 1500 mesh natural graphite powder (Shanghai Yifan Graphite Co., Ltd.) as a raw material, 220 ml of 98% concentrated sulfuric acid, 5 g of sodium nitrate, and 30 g of potassium permanganate were charged into 10 g of the natural graphite powder in an ice bath, the resulting mixture was mechanically stirred for 1 hour, and the temperature of the liquid mixture was kept at 20° C. or lower. The liquid mixture was taken out from the ice bath, and reacted with stirring in a water bath at 35° C. for 4 hours. Then, 500 ml of ion exchanged water was added to the liquid mixture, and the resulting suspension was reacted at 90° C. for another 15 minutes. Finally, 600 ml of ion exchanged water and 50 ml of hydrogen peroxide were charged into the suspension, and the resulting mixture was reacted for 5 minutes to give a graphene oxide dispersion liquid. The graphene oxide dispersion liquid was filtered while it was hot, metal ions were washed with a dilute hydrochloric acid solution, and the acid was washed with ion exchanged water. The washing was repeated until the pH reached 7 to prepare a graphene oxide gel. The element ratio of oxygen atoms to carbon atoms of the prepared graphene oxide gel measured by X-ray photoelectron spectroscopy was 0.53.

Example 1

The graphene oxide gel prepared in Synthesis Example 1 was diluted with ion exchanged water to a concentration of 30 mg/ml, and treated with an ultrasonic washer for 30 minutes to give a uniform graphene oxide dispersion liquid.

The graphene oxide dispersion liquid in an amount of 20 ml was mixed with 0.3 g of 3-chloroaniline hydrochloride as a surface treatment agent, and the mixture was treated with a homodisper model 2.5 (PRIMIX Corporation) at a rotation speed of 3000 rpm for 60 minutes. To the treated graphene oxide dispersion liquid, ultrasonic waves were applied at an output of 300 W for 30 minutes using an ultrasonic apparatus UP400 S (Hielscher Ultrasonics GmbH) (pulverization step). After the treatment, the graphene oxide dispersion liquid was diluted with ion exchanged water to 5 mg/ml, 0.3 g of sodium dithionite was added to 20 ml of the diluted dispersion liquid, and the mixture was subjected to reduction reaction at 40° C. for 1 hour. Then, a washing step of filtering the resulting product with a vacuum suction filter and then diluting the filtrate to 0.5% by mass with water and subjecting the diluted liquid to suction filtration was repeated five times to give a graphene water dispersion liquid. The obtained graphene water dispersion liquid was freeze-dried to give a surface-treated graphene.

Example 2

A surface-treated graphene was prepared in the same manner as in Example 1 except that the surface treatment agent was changed to 0.3 g of benzylamine hydrochloride.

Example 3

A surface-treated graphene was prepared in the same manner as in Example 1 except that the surface treatment agent was changed to 0.3 g of 2-phenylethylamine hydrochloride.

Example 4

A surface-treated graphene was prepared in the same manner as in Example 1 except that the surface treatment agent was changed to 0.3 g of 1-naphthylamine hydrochloride.

Example 5

To the graphene water dispersion liquid obtained in Example 1, NMP was added so that the content of NMP would be 0.5% by mass, and the mixture was diluted and treated with FILMIX (registered trademark) model 30-30 (PRIMIX Corporation) at a rotation speed of 40 m/s (shear rate: 20,000/sec) for 60 seconds (strong stirring step). After the treatment, the solvent was removed by vacuum suction filtration. In order to further remove moisture, a step of adding NMP until the content of NMP would be 0.5% by mass, treating the mixture using a homodisper model 2.5 (PRIMIX Corporation) at a rotation speed of 3000 rpm for 30 minutes, diluting the mixture, and subjecting the mixture to vacuum suction filtration after the dilution was repeated twice to give a surface-treated graphene/organic solvent dispersion liquid.

Example 6

A surface-treated graphene/organic solvent dispersion liquid was prepared in the same manner as in Example 5 except that the surface treatment agent was changed to 0.3 g of benzylamine hydrochloride.

Example 7

A surface-treated graphene/organic solvent dispersion liquid was prepared in the same manner as in Example 5 except that the surface treatment agent was changed to 0.3 g of 2-phenylethylamine hydrochloride.

Example 8

A surface-treated graphene/organic solvent dispersion liquid was prepared in the same manner as in Example 5 except that the surface treatment agent was changed to 0.3 g of 1-naphthylamine hydrochloride.

Example 9

A surface-treated graphene/organic solvent dispersion liquid obtained in the same manner as in Example 5 was mixed with an electrode active material $LiNi_{0.5}Co_{0.2}Mn_{0.3}O_2$ at a mass ratio of solid content of 3:100, and the mixture was diluted with NMP so as to have a solid content of 10% by mass, and treated with FILMIX (registered trademark) (model 30-30, PRIMIX Corporation) at a rotation speed of 40 m/s (shear rate: 20,000/sec) for 60 seconds. The treated product was dried by spray drying at an inlet temperature of 250° C. and an outlet temperature of 160° C. to give composite particles of a graphene and the electrode active material $LiNi_{0.5}Co_{0.2}Mn_{0.3}O_2$ (surface-treated graphene/ electrode active material composite particles).

The battery performance was evaluated in the same manner as in Measurement Example 8 except that the composite particles (97 parts by mass) were used as a positive electrode active material and the graphene dispersion liquid was not added singly.

Example 10

A surface-treated graphene/organic solvent dispersion liquid was prepared in the same manner as in Example 9 except that the surface treatment agent was changed to 0.3 g of benzylamine hydrochloride.

Example 11

A surface-treated graphene/organic solvent dispersion liquid was prepared in the same manner as in Example 9 except that the surface treatment agent was changed to 0.3 g of 2-phenylethylamine hydrochloride.

Example 12

A surface-treated graphene/organic solvent dispersion liquid was prepared in the same manner as in Example 9 except that the surface treatment agent was changed to 0.3 g of 1-naphthylamine hydrochloride.

Comparative Example 1

A graphene/organic solvent dispersion liquid was prepared in the same manner as in Example 5 except that no surface treatment agent was added.

Comparative Example 2

A surface-treated graphene was prepared in the same manner as in Example 1 except that the surface treatment agent was changed to 0.3 g of dopamine hydrochloride.

Comparative Example 3

A surface-treated graphene/organic solvent dispersion liquid was prepared in the same manner as in Example 5 except that the surface treatment agent was changed to 0.3 g of dopamine hydrochloride.

Example 13

A surface-treated graphene/organic solvent dispersion liquid was prepared in the same manner as in. Example 5 except that the part of treating the mixture with FILMIX (registered trademark) model 30-30 (PRIMIX Corporation) at a rotation speed of 40 m/s (shear rate: 20,000/sec) for 60 seconds (strong stirring step) was changed to treatment with a homodisper model 2.5 (PRIMIX Corporation) at a rotation speed of 3000 rpm for 30 minutes.

Example 14

A surface-treated graphene/organic solvent dispersion liquid was prepared in the same manner as in Example 5 except that the part of treating the mixture by vacuum suction filtration was changed to the form of subjecting the mixture to centrifugal separation, removing the supernatant, and recovering the precipitate.

The production conditions and physical properties of the surface-treated graphene or the surface-treated graphene/ organic solvent dispersion liquid of each of the examples and comparative examples, and the battery performance evaluation of the lithium ion secondary batteries produced using the surface-treated graphene or the surface-treated graphene/organic solvent dispersion liquid are shown in Tables 1 to 4.

TABLE 1

| | Production conditions of surface-treated graphene or surface-treated graphene/ organic solvent dispersion liquid | | | Physical properties of surface-treated graphene or surface-treated graphene/ organic solvent dispersion liquid | | | | | | |
|---|---|---|---|---|---|---|---|---|---|---|
| | Strong stirring step | Surface treatment agent | Method for removing solvent in organic solvent substitution step | O/C ratio | N/C ratio | Amount of attached surface treatment agent [% by mass] | Size in plane direction [um] | Thickness [nm] | Specific surface area [$m^2/g$] | Solid content [% by mass] |
| Example 1 | — | 3-chloroaniline hydrochloride | — | 0.13 | 0.014 | 17.8 | 3.5 | 17 | 154 | — |
| Example 2 | — | benzylamine hydrochloride | — | 0.12 | 0.013 | 15.3 | 3.6 | 17 | 155 | — |
| Example 3 | — | 2-phenylethylamine hydrochloride | — | 0.12 | 0.013 | 17.1 | 3.4 | 17 | 156 | — |
| Example 4 | — | 1-naphthylamine hydrochloride | — | 0.13 | 0.012 | 18.5 | 3.5 | 18 | 147 | — |
| Example 5 | FILMIX Rotation speed: 40 m/s Treatment time: 60 s | 3-chloroaniline hydrochloride | Vacuum suction filtration | 0.13 | 0.014 | 17.8 | 3.2 | 15 | 154 | 3.9 |
| Example 6 | FILMIX Rotation speed: 40 m/s Treatment time: 60 s | benzylamine hydrochloride | Vacuum suction filtration | 0.12 | 0.013 | 15.3 | 3.1 | 15 | 155 | 4.0 |
| Example 7 | FILMIX Rotation speed: 40 m/s Treatment time: 60 s | 2-phenylethylamine hydrochloride | Vacuum suction filtration | 0.12 | 0.013 | 17.1 | 3.1 | 15 | 156 | 4.0 |
| Example 8 | FILMIX Rotation speed: 40 m/s Treatment time: 60 s | 1-naphthylamine hydrochloride | Vacuum suction filtration | 0.13 | 0.012 | 18.5 | 3.3 | 16 | 147 | 4.1 |

TABLE 2

| | Battery performance evaluation | | | | |
|---|---|---|---|---|---|
| | Form of existence in electrode | Discharge capacity at 1 C [mAh/g] | Discharge capacity at 5 C [mAh/g] | Discharge capacity at 1 C (at 500th cycle) [mAh/g] | Cyclic voltammetry Oxidation potential [V] |
| Example 1 | Present singly | 140 | 79 | 102 | 4.3 |
| Example 2 | | 141 | 80 | 102 | 4.4 |
| Example 3 | | 141 | 80 | 103 | 4.4 |
| Example 4 | | 134 | 76 | 97 | 4.3 |
| Example 5 | | 150 | 101 | 117 | 4.3 |
| Example 6 | | 151 | 101 | 118 | 4.4 |
| Example 7 | | 152 | 102 | 119 | 4.4 |
| Example 8 | | 146 | 90 | 113 | 4.3 |

TABLE 3

| | Production conditions of surface-treated graphene or surface-treated graphene/ organic solvent dispersion liquid | | | Physical properties of surface-treated graphene or surface-treated graphene/ organic solvent dispersion liquid | | | | | | |
|---|---|---|---|---|---|---|---|---|---|---|
| | Strong stirring step | Surface treatment agent | Method for removing solvent in organic solvent substitution step | O/C ratio | N/C ratio | Amount of attached surface treatment agent [% by mass] | Size in plane direction [um] | Thickness [nm] | Specific surface area [$m^2/g$] | Solid content [% by mass] |
| Example 9 | FILMIX Rotation speed: 40 m/s Treatment time: 60 s | 3-chloroaniline hydrochloride | Vacuum suction filtration | 0.13 | 0.014 | 17.8 | 3.2 | 15 | 154 | — |
| Example 10 | FILMIX Rotation speed: 40 m/s Treatment time: 60 s | benzylamine hydrochloride | Vacuum suction filtration | 0.12 | 0.013 | 15.3 | 3.1 | 15 | 155 | — |
| Example 11 | FILMIX Rotation speed: 40 m/s Treatment time: 60 s | 2-phenylethylamine hydrochloride | Vacuum suction filtration | 0.12 | 0.013 | 17.1 | 3.1 | 15 | 156 | — |

TABLE 3-continued

| | Production conditions of surface-treated graphene or surface-treated graphene/ organic solvent dispersion liquid | | | Physical properties of surface-treated graphene or surface-treated graphene/ organic solvent dispersion liquid | | | | | | |
|---|---|---|---|---|---|---|---|---|---|---|
| | Strong stirring step | Surface treatment agent | Method for removing solvent in organic solvent substitution step | O/C ratio | N/C ratio | Amount of attached surface treatment agent [% by mass] | Size in plane direction [um] | Thickness [nm] | Specific surface area [m²/g] | Solid content [% by mass] |
| Example 12 | FILMIX Rotation speed: 40 m/s Treatment time: 60 s | 1-naphthylamine hydrochloride | Vacuum suction filtration | 0.13 | 0.012 | 18.5 | 3.3 | 16 | 147 | — |
| Comparative Example 1 | FILMIX Rotation speed: 40 m/s Treatment time: 60 s | — | Vacuum suction filtration | 0.15 | 0.000 | 0.0 | 4.1 | 137 | 496 | 4.3 |
| Comparative Example 2 | — | Dopamine hydrochloride | — | 0.17 | 0.020 | 34.0 | 3.5 | 17 | 136 | — |
| Comparative Example 3 | FILMIX Rotation speed: 40 m/s Treatment time: 60 s | Dopamine hydrochloride | Vacuum suction filtration | 0.17 | 0.020 | 34.0 | 3.2 | 15 | 136 | 4.1 |
| Example 13 | Homodisper 3000 rpm Treatment time: 30 min | 3-chloroaniline hydrochloride | Vacuum suction filtration | 0.13 | 0.014 | 17.8 | 25 | 206 | 69 | 4.0 |
| Example 14 | FILMIX Rotation speed: 40 m/s Treatment time: 60 s | 3-chloroaniline hydrochloride | Centrifugal sedimentation | 0.13 | 0.014 | 17.8 | 15 | 165 | 62 | 4.0 |

TABLE 4

| | | Battery performance evaluation | | | |
|---|---|---|---|---|---|
| | Form of existence in electrode | Discharge capacity at 1 C [mAh/g] | Discharge capacity at 5 C [mAh/g] | Discharge capacity at 1 C (at 500th cycle) [mAh/g] | Cyclic voltammetry Oxidation potential [V] |
| Example 9 | Composite | 150 | 103 | 125 | 4.3 |
| Example 10 | with active | 152 | 104 | 128 | 4.4 |
| Example 11 | material | 153 | 104 | 129 | 4.4 |
| Example 12 | particles | 146 | 93 | 122 | 4.3 |
| Comparative Example 1 | Present singly | 57 | 23 | 24 | 5.0 or more |
| Comparative Example 2 | | 131 | 68 | 86 | 4.1 |
| Comparative Example 3 | | 142 | 79 | 101 | 4.1 |
| Example 13 | | 103 | 55 | 51 | 4.3 |
| Example 14 | | 96 | 51 | 48 | 4.3 |

All of the surface-treated graphenes, surface-treated graphene/organic solvent dispersion liquids, and surface-treated graphene/electrode active material composite particles of Examples 1 to 14 had high discharge capacity at 1 C, high discharge capacity at 5 C, and high discharge capacity at 1 C (at the 500th cycle) in the battery performance evaluation, showing that they have high dispersibility and high electric conductivity. In addition, since they showed high oxidation potentials, it was shown that they have high electrochemical stability.

The invention claimed is:

1. A surface-treated graphene, comprising a graphene and a compound represented by the following general formula (1) or a neutralized salt thereof attached to the graphene, wherein the surface-treated graphene has an element ratio of oxygen to carbon (O/C ratio) of 0.05 or more and 0.40 or less as measured by X-ray photoelectron spectroscopy, and wherein the surface-treated graphene has a specific surface area as measured by a BET measurement method of 80 m²/g or more and 250 m²/g or less:

(1)

wherein
A represents a phenolic hydroxy group-free benzene-based aromatic group having a condensation number of 1 to 4,
$R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure,
$R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

2. The surface-treated graphene according to claim 1, wherein 3% by mass or more and 50% by mass or less, relative to the graphene, of the compound represented by the general formula (1) or a neutralized salt thereof is attached to the graphene.

3. The surface-treated graphene according to claim 1, having an element ratio of nitrogen to carbon (N/C ratio) of 0.005 or more and 0.020 or less as measured by X-ray photoelectron spectroscopy.

4. The surface-treated graphene according to claim 1, wherein in the general formula (1), $R^1$ is an alkylene group having 1 to 12 carbon atoms, an alkenoxyalkylene group having 2 to 12 carbon atoms, or a direct bond.

5. The surface-treated graphene according to claim 1, wherein in the general formula (1), $R^2$ and $R^3$ are each a hydrogen atom, a phenyl group, an alkyl group having 1 to 12 carbon atoms, or an alkoxyalkyl group having 2 to 12 carbon atoms.

6. The surface-treated graphene according to claim 1, wherein the compound represented by the general formula (1) is a compound selected from the group consisting of compounds represented by the following formulae (2) to (5):

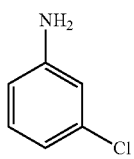

(2)

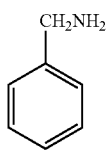

(3)

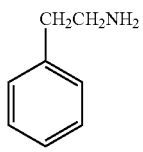

(4)

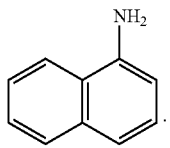

(5)

7. A surface-treated graphene/organic solvent dispersion liquid, comprising the surface-treated graphene according to claim 1 dispersed in an organic solvent.

8. The surface-treated graphene/organic solvent dispersion liquid according to claim 7, having a solid content of 0.3% by mass or more and 40% by mass or less.

9. Surface-treated graphene/electrode active material composite particles, comprising a composite of the surface-treated graphene according to claim 1 and electrode active material particles.

10. An electrode paste, comprising the surface-treated graphene according to claim 1, electrode active material particles, and a binder.

11. A method for producing a surface-treated graphene, comprising mixing graphene oxide with a compound represented by the following general formula (1) or a neutralized salt thereof, and subsequently comprising a reduction step of subjecting the graphene oxide to reduction treatment:

(1)

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

12. A method for producing a surface-treated graphene/organic solvent dispersion liquid, comprising mixing graphene oxide with a compound represented by the following general formula (1) in a state where the graphene oxide and the compound are dispersed in an aqueous solution, and then subjecting the graphene oxide to reduction treatment, and further comprising an organic solvent substitution step of substituting the solvent with an organic solvent:

(1)

wherein

A represents a phenolic hydroxy group-free benzene-based aromatic group having a condensation number of 1 to 4, $R^1$ represents a direct bond, a divalent hydrocarbon group having 1 to 12 carbon atoms, or a divalent organic group having 1 to 12 carbon atoms and having a structure selected from the group consisting of an ether bond, an ester bond, an alcohol structure, and a carbonyl structure, $R^2$ and $R^3$ each independently represent a hydrogen atom, a hydrocarbon group having 1 to 12 carbon atoms, or an organic group having 1 to 12 carbon atoms and having a structure selected from the group consisting of an ether bond, an ester bond, an alcohol structure, and a carbonyl structure, and n represents an integer of 1 to 6.

13. The method for producing a surface-treated graphene/organic solvent dispersion liquid according to claim 12, wherein in the organic solvent substitution step, at any stage before final solvent removal, a strong stirring step is performed, the strong stirring step being a step of stirring a surface-treated graphene/water dispersion liquid and the organic solvent in a mixed state with a high shear mixer at a shear rate of 5,000/sec to 50,000/sec.

\* \* \* \* \*